C. M. WRIGHT & W. L. SHAB.
LOCKING DEVICE FOR AUTOMOBILES.
APPLICATION FILED MAY 15, 1915.
1,169,588.
Patented Jan. 25, 1916.
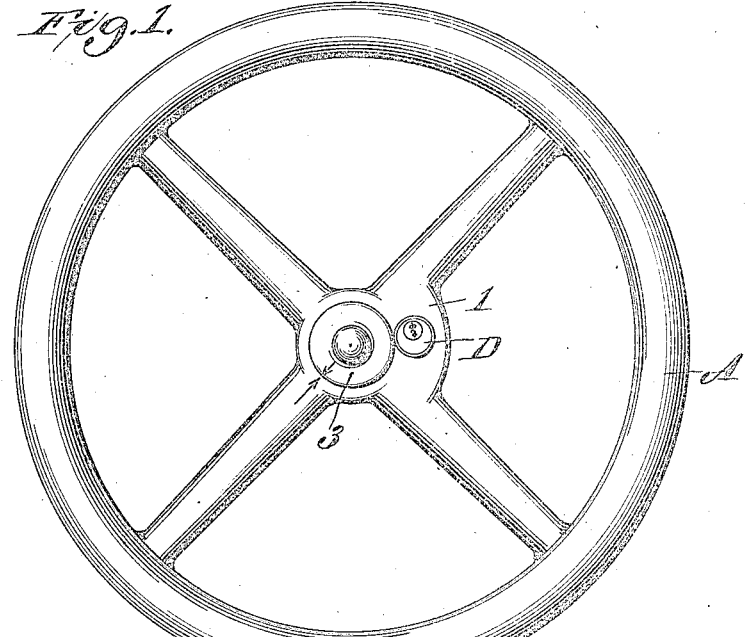
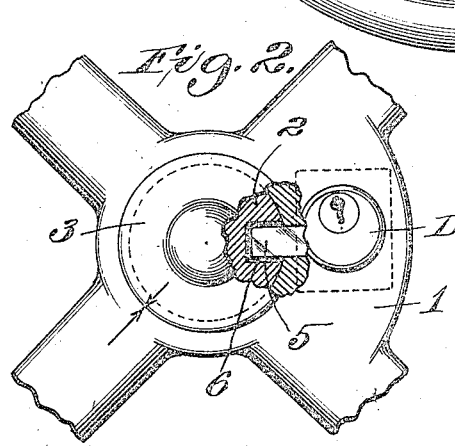
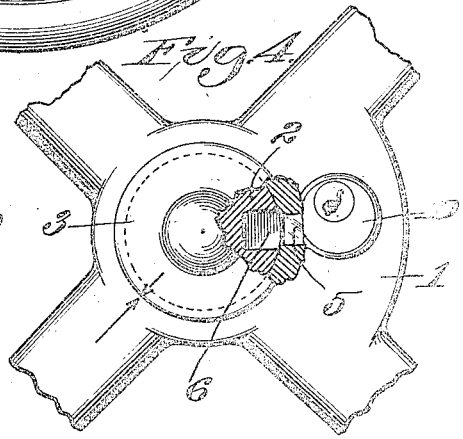
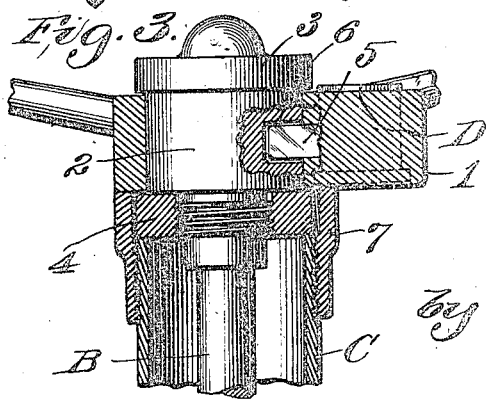

UNITED STATES PATENT OFFICE.

CHARLES M. WRIGHT AND WILLIAM L. SHAB, OF ALTAMONT, ILLINOIS.

LOCKING DEVICE FOR AUTOMOBILES.

1,169,588.  Specification of Letters Patent.  Patented Jan. 25, 1916.

Application filed May 15, 1915.  Serial No. 28,425.

*To all whom it may concern:*

Be it known that we, CHARLES M. WRIGHT and WILLIAM L. SHAB, citizens of the United States, residing in the city of Altamont, county of Effingham, and State of Illinois, have invented a certain new and useful Improvement in Locking Devices for Automobiles, of which the following is a full, clear, and exact description, such as will enable others skilled in the art to which it appertains to make and use the same.

This invention relates to devices that are used for locking an automobile during the absence of the owner or person in charge of the vehicle, so as to prevent the vehicle from being used by an unauthorized person.

The main object of the invention is to provide a device of the character mentioned, which is so constructed that the steering column of an automobile cannot be turned by manipulating the steering wheel when the vehicle is locked.

Another object is to provide an inexpensive automobile locking device of simple construction, which is so designed that it is practically impossible for an unauthorized person to use the vehicle to which the device is applied. And still another object is to provide a steering mechanism for automobiles comprising a steering column, a steering wheel mounted on the column and a key-controlled device that serves to connect the steering wheel and steering column together, and which is adapted to be actuated so as to disconnect said elements, and thus render the steering column inoperative.

Other objects and desirable features of the invention will be hereinafter pointed out.

Figure 1 of the drawings is a top plan view of an automobile steering mechanism constructed in accordance with our invention. Fig. 2 is an enlarged top plan view of a portion of the steering wheel and the upper end of the steering column broken away so as to more clearly illustrate the device that connects the steering wheel and steering column together. Fig. 3 is a vertical sectional view of the parts illustrated in Fig. 2, showing the hub on the steering column in elevation and partly broken away. Fig. 4 is a view similar to Fig. 2, showing the connecting devices between the steering wheel and steering column rendered inoperative so as to lock the vehicle.

Briefly stated, our invention consists in a steering mechanism for automobiles comprising a steering column, a steering wheel loosely mounted on the steering column and a key-controlled device for rigidly connecting said steering wheel and steering column together, said device preferably consisting of the plunger of a mortised lock mounted in the steering wheel.

Referring to the drawings, which illustrate the preferred form of our invention, A designates the steering wheel of an automobile steering mechanism and B designates the steering column on the upper end of which the steering wheel is mounted. The wheel A is loosely mounted on the hub portion 2 at the upper end of the steering column B and is held in operative position on said hub portion by means of a cap piece 3 on the hub portion 2 that laps over the center portion of the steering wheel and a retaining nut 4 on the steering column B arranged under the hub portion 2 and projecting laterally far enough to engage the steering wheel and prevent it from moving downwardly away from the cap piece 3, said nut 4 being mounted on an externally screw-threaded portion on the steering column B, as shown in Fig. 3. A tubular housing C that surrounds the steering column bears against the nut 4 and prevents it from working loose and a sleeve 7 on the upper end of said housing incases said nut.

The center portion of the steering wheel from which the spokes of the wheel radiate is provided with a portion 1 in which a mortised lock D is seated, the plunger 5 of said lock being adapted to enter a notch or recess 6 in the hub portion 2 of the steering column so as to rigidly connect the steering wheel and steering column together. When the vehicle is in use the plunger 5 of the lock D serves to rigidly connect the steering wheel and column together, and thus transmits movement from the steering wheel to the steering column. When it is desired to lock the vehicle the key is inserted in the lock D and manipulated so as to withdraw the plunger 5 from the recess 6 in the hub portion 2 of the steering column, as shown in Fig. 4, thus rendering the steering mechanism inoperative or putting it in such a condition that the steering column B cannot be turned by manipulating the steering wheel A. In other words, after the lock D has been actuated so as to withdraw the connecting device 5 from the recess 6 in the steering column, the vehicle will be effectively locked, owing to the fact that the steering mechanism cannot be operated to guide or control the vehicle. To render the steering mechanism operative it is only necessary to insert the key in the lock D and manipulate same so as to cause the plunger 5 to enter the recess provided for same in the steering column, and thus rigidly connect the steering wheel and steering column together. We prefer to use a lock D of the so-called Yale type, as a lock of this design can be arranged conveniently in the steering wheel, and it is so constructed that there is little liability of its being picked or opened by an unauthorized person. A steering mechanism of this construction looks practically the same as the steering mechanisms now universally used on automobiles, as the only difference in the external appearance of the mechanism consists in the enlarged portion 1 at the center of the wheel in which the lock D is seated. The device 5 that connects the steering wheel and column together is completely hidden from view, and as said device can be reached only by first taking off the steering wheel, there is very little liability of its being tampered with, as the entire steering column has to be dismantled in order to remove the steering wheel from the hub portion 2 of the steering column, owing to the fact that the steering wheel is retained in position on the hub portion 2 by means of the integral cap piece at the upper end of said hub portion that laps over the steering wheel and the nut 4 on the steering column that is arranged underneath the steering wheel. Said nut 4 is held in position by the tubular sleeve or housing C that surrounds the steering column, and consequently, said nut cannot be unscrewed without first moving the casing C downwardly.

While we have herein shown our invention embodied in a steering mechanism in which the plunger of the lock D is utilized to connect the steering wheel and steering column together, we do not wish it to be understood that our invention is limited to such a construction, for our broad idea consists in connecting the steering wheel and steering column of an automobile together by means of a shiftable member that is governed by a key-controlled device.

Having thus described our invention, what we claim, and desire to secure by Letters Patent, is:

A steering mechanism for automobiles, comprising a steering column having a hub portion which is provided at its upper end with a cap piece, a steering wheel loosely mounted on said hub portion under said cap piece and provided with an integral web extending between two of the spokes thereof, a mortised lock arranged in said web and provided with a plunger that is adapted to enter a notch or recess in said hub portion, a nut on said steering column arranged underneath said steering wheel so as to clamp said wheel between said nut and the cap piece on the hub portion, a casing or housing for said steering column which bears against the underside of said nut, and a screw-threaded sleeve on the upper end of said housing that incases said nut.

In testimony whereof, we hereunto affix our signatures in the presence of two witnesses, this 11th day of May, 1915.

CHARLES M. WRIGHT.
WILLIAM L. SHAB.

Witnesses:
HENRY HEDEMANN,
FRANK SCHLOTTERBECK.